United States Patent [19]

Mays

[11] 3,964,697

[45] June 22, 1976

[54] DEPLOYABLE WING BACK PACK

[75] Inventor: Kittrell W. Mays, Miami, Fla.

[73] Assignee: Lawrence Peska Associates, Inc., New York, N.Y. ; a part interest

[22] Filed: Apr. 30, 1975

[21] Appl. No.: 573,134

[52] U.S. Cl............................. 244/64; 244/138 R; 244/143
[51] Int. Cl.²........................................ B64C 31/04
[58] Field of Search .............. 244/143, 147, 64, 16, 244/138 R, 142, 151 R

[56] References Cited
UNITED STATES PATENTS

| 2,067,423 | 1/1937 | Sohn et al.................... | 244/138 R X |
| 2,181,326 | 11/1939 | Griffin........................ | 244/138 R X |

FOREIGN PATENTS OR APPLICATIONS

| 823,884 | 1/1938 | France................................ | 244/143 |

*Primary Examiner*—Trygve M. Blix
*Assistant Examiner*—Barry L. Kelmachter
*Attorney, Agent, or Firm*—Jack D. Slobod

[57] ABSTRACT

A pair of sector-shaped wings stored in a pair of spaced apart elongated housings strapped vertically to the back of the user and adapted to be deployed from the housings utilizing rotatably mounted handles secured to the wings. Each housing has a longitudinal opening through which a wing is packed into a housing and deployed therefrom. Each wing comprises a pliable sheet of material which is secured to its respective housing along one side margin and secured to a rigid strip at another side margin. The strips are pivotly mounted and carry the handles which allow the wings to be manipulated by the arms of the user for accomplishing sky diving maneuvers.

8 Claims, 6 Drawing Figures

DEPLOYABLE WING BACK PACK

FIELD OF THE INVENTION

The present invention relates generally to flying, gliding or exercising apparatus having articulatable wings strapped to the back of a man and manipulated by the man's arms. In its particular aspects the present invention relates to the storage of a pair of such wings in a housing adapted to be secured on the back of a man so that the wings may be deployed when desired.

BACKGROUND OF THE INVENTION

In skydiving, a diver goes through a period of descent prior to deployment of his parachute, when the arms and legs of the diver are manipulated as drag surfaces to cause components of horizontal motion toward a desired landing site. However, the desired motion often is not achieved, because the arms and legs do not present sufficient drag area to influence the course of the diver as much as desired. While there are various devices in the prior art which involve large area wings manipulated by the arms of a man these devices are not suitable for use in skydiving, both because they would hinder a man during the act of jumping from an aircraft, and because they would interfere with the provision of a pack for a parachute.

OBJECTS OF THE INVENTION

It is an object of the present invention to provide a pair of wings for use by a skydiver for generating horizontal components of motion.

It is a further object of the present invention to provide a pair of wings to be manipulated by the arms of a man in a manner in which the area presented by each wing is independently variable.

It is another object of the present invention to provide a pair of wings for a skydiver which will not hinder the diver during the act of jumping from an aircraft.

It is yet another object of the present invention to provide a set of wings for a skydiver which will allow for the provision of a parachute pack.

SUMMARY OF THE INVENTION

Briefly, the aforementioned and other objects of the present invention are satisfied by providing a pair of wings for a diver which are normally stored in a pair of spaced apart elongated housings secured vertically to a diver's back and are deployed from the housings when desired after the diver has jumped from an aircraft. The housings are spaced apart to allow the provision of a parachute pack therebetween. Each housing has an opening along the side of the diver from which the wings are deployed utilizing handles secured thereto which protrude from the openings.

For allowing a great deal of independent control of the instantaneous area of each wing, the wings are formed as sector shaped pliable sheets, one straight margin of each sheet being secured to the housing for the wing and the other straight margin being secured to a rigid strip which is pivotly secured at a top end to the housing. The handles are provided near the bottom end of the strips, so that when the handles are gripped each wing may be manipulated either to a maximum area with the arm rotated upward or to a negligible area with the arm at the diver's side.

Other objects, features and advantages of the present invention will become apparent upon perusal of the following detailed description of the preferred embodiment thereof when taken in conjunction with the appended drawing wherein.

DETAILED DESCRIPTION

Figure 1:
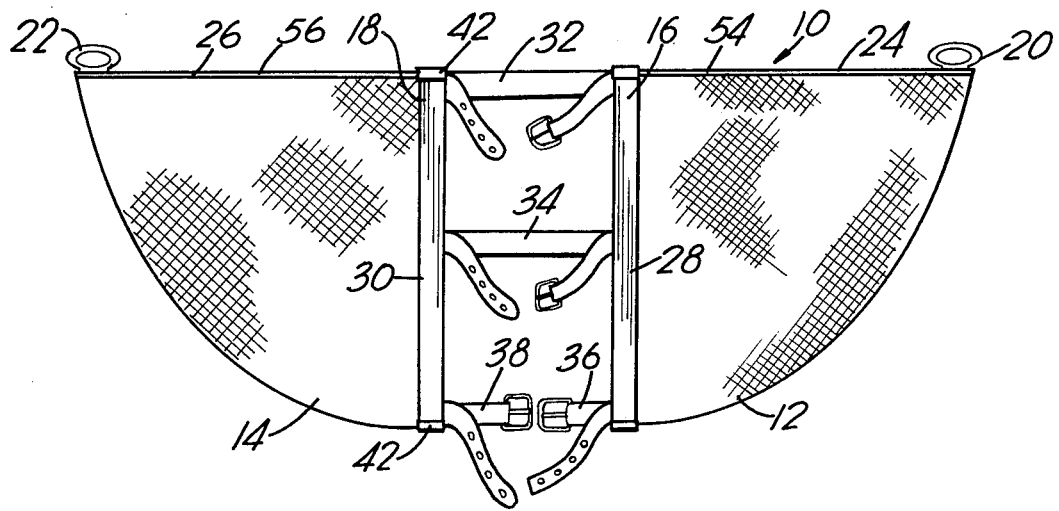
FIG. 1 is a front view of the wing apparatus of the present invention with the wings deployed and presenting their greatest area.
Figure 6:
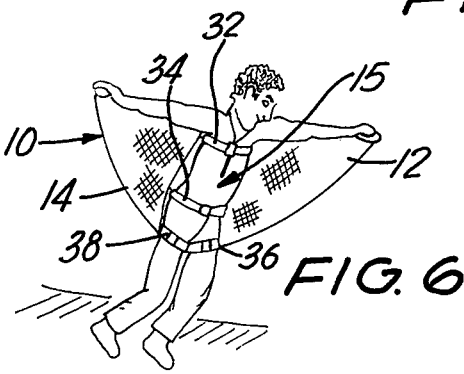
FIG. 6 is a frontal pictorial presentation of the wing apparatus of FIG. 1 mounted on a user.

Referring first to FIGS. 1 and 6, the deployable wing apparatus 10 of the present invention comprises wings 12 and 14 which are carried in a deployed position respectively below the left and right arms of a user 15, such as a sky diver, by handles 20 and 22 secured to the far ends of the upper edges 24 and 26 of the respective wings. Wings 12 and 14 are each a continuous sheet of pliable material, such as canvas, which is cut in the shape of a ninety degree sector, one straight margin or side of which forms the aforementioned upper wing edges 24 and 26.

Figure 2:
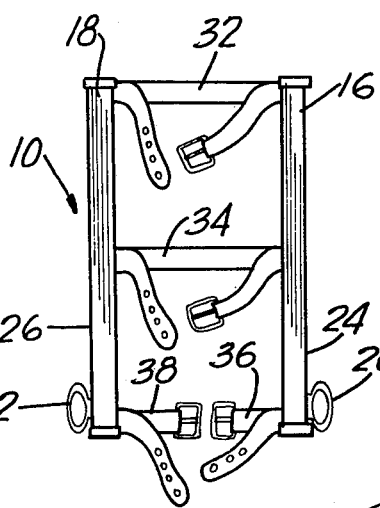
FIG. 2 is a front view similar to FIG. 1 except with the wings stowed.

Left and right elongated tubular housings 16 and 18, which are adapted to be mounted vertically in spaced apart relationship on the back of user 15 are provided to respectively house the left and right wings 12 and 14 in a stowed condition as shown in FIG. 2. The other straight margins or sides 28 and 30 of left and right wings 12 and 14 are secured along the length of housings 16 and 18. Thus, in view of the ninety degree sector shape of wings 12 and 18, the upper edges 24 and 26 are horizontal when wings 12 and 14 are fully deployed, as shown in FIG. 1.

For mounting housings 16 and 18 to user 15, there are provided four belts. Belts 32 is separately secured to each of the housings at their tops and is adapted to pass completely around the torso under the arms of user 15. Belt 34 is separately secured to each of the housings 16 and 18 at a distance intermediate their lengths and adapted to pass completely around the waist of user 15. Belts 36 and 38 are respectively secured to the bottom ends of housings 16 and 18 and are adapted to respectively strap around the left and right thighs of user 15.

The pair of housings 16 and 18, which in effect form a single housing means for the pair of wings 12 and 14, are spaced apart to provide for the mounting of a parachute pack (not shown) therebetween on the back of a skydiver. The wings 12 and 14, by being retained initially in the housings 16 and 18, do not interfere with the sky diver's act of jumping out of an airplane. After clearing the aircraft the skydiver may grasp the handles 20 and 22 which protrude respectively from housings 12 and 14 in which the wings have been packed (FIG. 2) and pull out the wings. The sky diver then by varying the amount of upward rotation of his arms can vary the amount of area presented by each wing in order to maneuver horizontally over a desired landing point and thereafter deploy his parachute to slow his descent.

Figure 3:
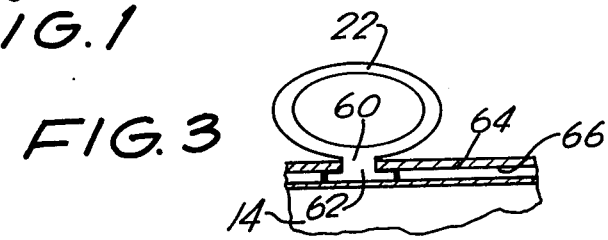
FIG. 3 is a cross-sectional enlargement of the left hand corner of FIG. 1.
Figure 4:
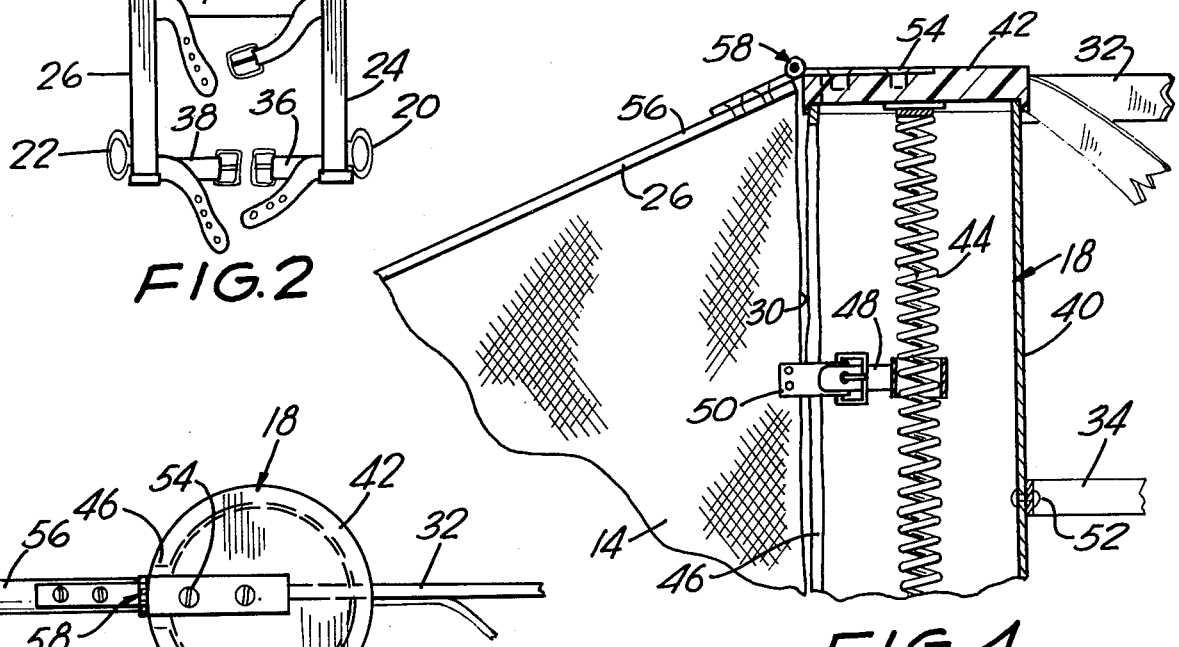
FIG. 4 is a partial cross-sectional enlarged front view showing a deployed wing presenting an intermediate area.
Figure 5:
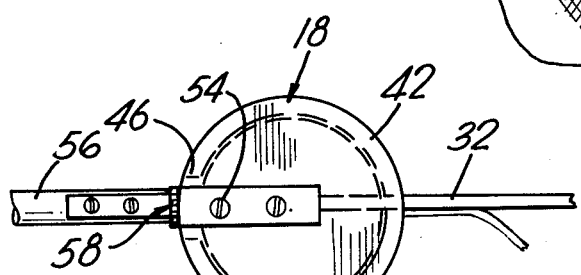
FIG. 5 is a top view of FIG. 6.

Referring next to FIGS. 3 through 5, the wing apparatus 10 of the present invention will now be understood in some of its more specific aspects. Each of the tubular housings 16 and 18 is formed of thin walled bendable material 40 which is secured at each end of the tube to a cylindrical end cap 42. Disposed centrally within the tubular housings 16 and 18 and running the length of the housings between the top and bottom end caps 42 is a spine means 44 configured preferably as a relatively stiff steel compression spring as of ½ inch diameter. Spine means 44 allows the bendable housings 16 and 18 to conform to the back of user 14.

Tubular housings 16 and 18 are further provided with an elongated slot 46, running substantially the entire length of the housing sides through which the wings 12 and 14 are packed into the interior of the respective housings.

The margins 28 and 30 of the wings 12 and 14 are secured to the respective housings 16 and 18 by belts 46 secured to the margins at points along the length of the margins, as by rivets 50, then passing through openings 46 and wrapped around spine means 44. Similarly the belts 32-38 are secured to housings 18 as by rivets 52.

For supporting the upper edges or margins 24 and 26 of the respective wings 12 and 14, the margins are respectively secured along their lengths to elongated strips 54 and 56. In order to constrain the wings 12 and 14 for the desired movement in correspondence to the rotation of the arms of the user 15, the upper ends of strips 54 and 56 are rotatably mounted to the respective housings 16 and 18 for movement about a horizontal axis by piano hinges 58 attached to the top end caps 42 by screws 54.

Referring now to FIGS. 3 and 6, the handles 22 and 24 are preferably configured as elongated closed loops which have a stem portion 60 connected to a pin portion 62. The bottom or far end of strips 54 and 56 are provided as tubular portions 64 to accept pin 62 in the bore 66 thereof, there also being in tubular portions 64 an angular cutout for stem 60 to allow handles 20 and 22 to rotate about pin 62 approximately ninety degrees. This rotatable mounting of the handles 20 and 22 about axes parallel to the upper margins 24 and 26 of the wings allows the handles to be comfortably addressed by the hands in all angular positions of the arms of user 15 ranging between the arms at the user's side to the arms out horizontally.

Having described in great detail a preferred embodiment of my invention, it should be apparent that numerous modifications, additions and omissions are possible in the details thereof which would still be within the spirit and scope of the invention. Accordingly, reference as to the scope of the invention should be made to the following claims.

What is claimed is:

1. Wing apparatus adapted to be worn by a man comprising: a pair of wings, said wings, adapted to be operatively manipulated by opposite arms of a man via a pair of handle means respectively carried by said pair of wings, housing means for storing said wings, said housing means having a pair of opposed external sides, each side having an elongated opening for the introduction of a wing into said housing means with said handle means protruding from said housing means and harness means for securing said housing means to the back of a man with said openings running along the sides of the man whereby said wings may be deployed by pulling said handle means.

2. The apparatus of claim 1 wherein each of said wings comprise a pliable sheet of material having two intersecting sides, one side of each sheet being secured to a different side of said housing means, a pair of rigid strips, each strip being secured to another side of each sheet, one end of each strip being pivotly connected to said housing means, said handle means being secured to said strips.

3. The apparatus of claim 2 wherein said pair of handle means are respectively secured to the strips of said wings by means for enabling rotation of said handle means relative to said strips.

4. The apparatus of claim 2 wherein said housing means comprises a pair of elongated spaced apart housings, one for storing each wing, the said elongated openings being an opening in each housing.

5. The apparatus of claim 4, wherein said housings are bendable and are each supported by a spine means within and running the length of each housing, whereby said housings may conform to the shape of the back of the man.

6. Wing apparatus adapted to be worn by a man comprising: a pair of wings, said wings adapted to be operatively manipulated by opposite arms of a man via a pair of handle means respectively carried by said pair of wings, housing means for storing said wings, said housing means having a pair of opposed external sides, each side having an elongated opening for receiving a wing with said handle means protruding from said housing means and harness means for securing said housing means to the back of a man with said openings running along the sides of the man whereby said wings may be deployed by pulling said handle means, wherein each of said wings comprise a pliable sheet of material having two intersecting sides, one side of each sheet being secured to a different side of said housing means, a pair of rigid strips, each strip being secured to another side of each sheet, one end of each strip being pivotly connected to said housing means and wherein said pair of handle means are respectively secured to said strips of said wings by means for enabling rotation of said handle means relative to said wings.

7. The apparatus of claim 6 wherein said housing means comprises a pair of elongated spaced apart housings, one for storing each wing, the said elongated openings being an opening in each housing.

8. The apparatus of claim 6 wherein said housings are bendable and are each supported by a spine means within and running the length of each housings, whereby said housings may conform to the shape of the back of the man.

* * * * *